United States Patent [19]

Stevenson

[11] 4,188,581
[45] Feb. 12, 1980

[54] SIGNALLING SYSTEM

[76] Inventor: Roy A. Stevenson, 809 E. Tujunga, Burbank, Calif. 91501

[21] Appl. No.: 796,996

[22] Filed: May 16, 1977

[51] Int. Cl.² .......................... H03K 5/20; H04B 1/00
[52] U.S. Cl. ................................. 325/38 R; 325/321; 325/142; 328/111; 307/234; 329/106
[58] Field of Search ..................... 325/321, 38 R, 140, 325/141, 142, 143, 164; 179/15 AW; 328/111, 112, 65; 307/234; 329/104, 105, 106, 107, 109

[56] References Cited

U.S. PATENT DOCUMENTS

| | | | |
|---|---|---|---|
| 2,905,887 | 9/1959 | Taddeo | 328/111 |
| 3,046,483 | 7/1962 | Breskind | 328/111 |
| 3,281,806 | 10/1966 | Lawrence | 325/142 |
| 3,460,068 | 8/1969 | Lechleider | 325/142 |
| 4,061,975 | 12/1977 | Sugai | 179/15 AW |
| 4,061,976 | 12/1977 | Sugai | 179/15 AW |

Primary Examiner—Robert L. Griffin
Assistant Examiner—Michael A. Masinick
Attorney, Agent, or Firm—John E. Wagner

[57] ABSTRACT

A signalling system designed to transmit and reliably detect alpha-numeric information with a single pulse indicating each different numeral from 0 to 9 and letters of the alphabet or code symbol. Each alpha-numeric symbol is coded in a single pulse of discreet difference lengths at the transmitting station. At the receiving station the train of pulses which is received is introduced into a transmission line having multiple taps with each tap related in position to detect a particular alpha-numeric encoded pulse. The transmission line is terminated with an impedance mismatch whereby each pulse is reflected back down the line. Detection occurs when the leading edge and the trailing edge of a pulse are coincident at the tap. Pulses having a length differing by only 40 nanoseconds (±20 nanoseconds) are easily detected. The range of pulse lengths for a 40 numeral code recommended is 110 nanoseconds to 1990 nanoseconds with an average tap separation of 24.87 nanoseconds. The pulse detector is basically a tapped helix. An embodiment of an anti-collision system is disclosed.

15 Claims, 22 Drawing Figures

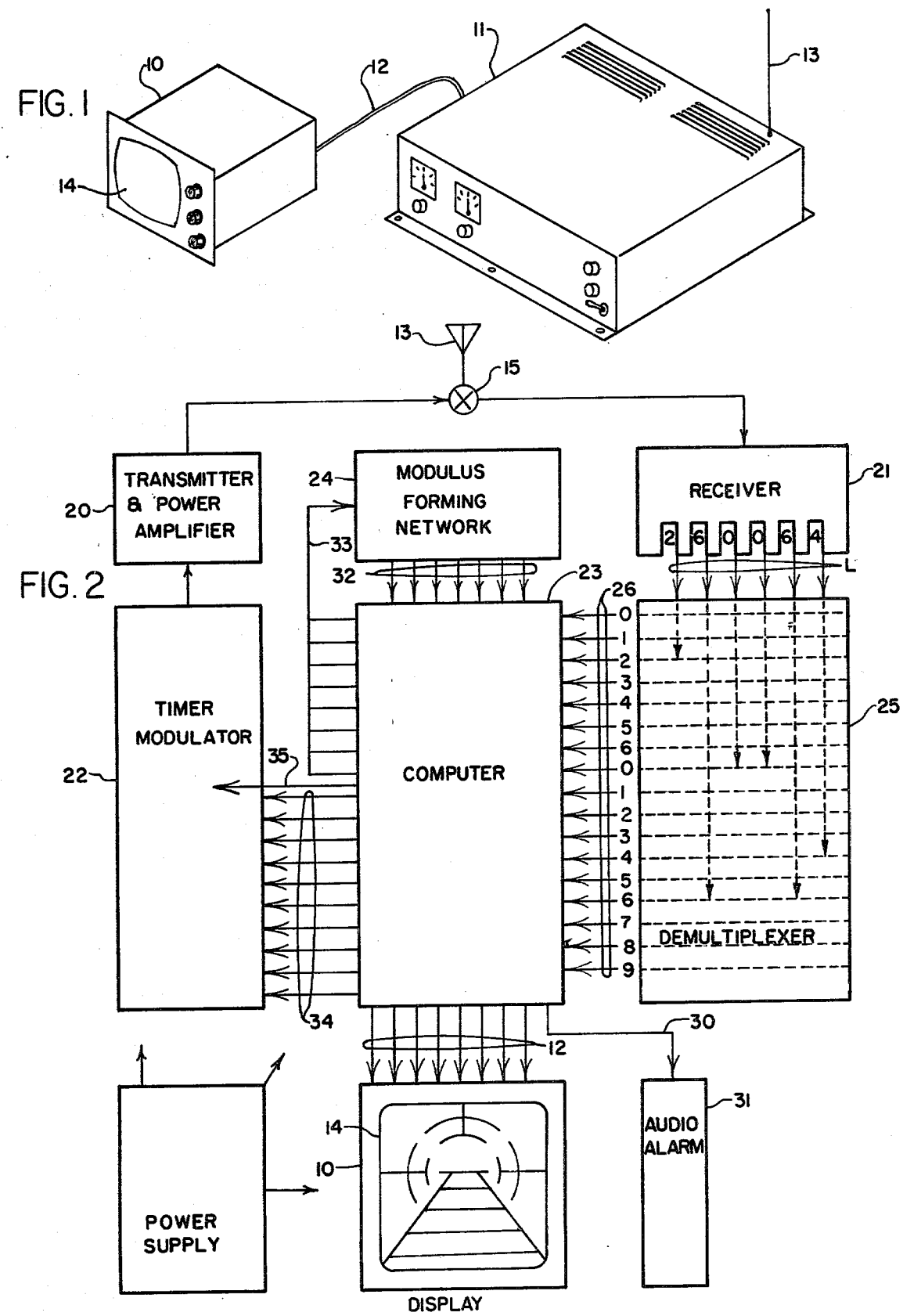

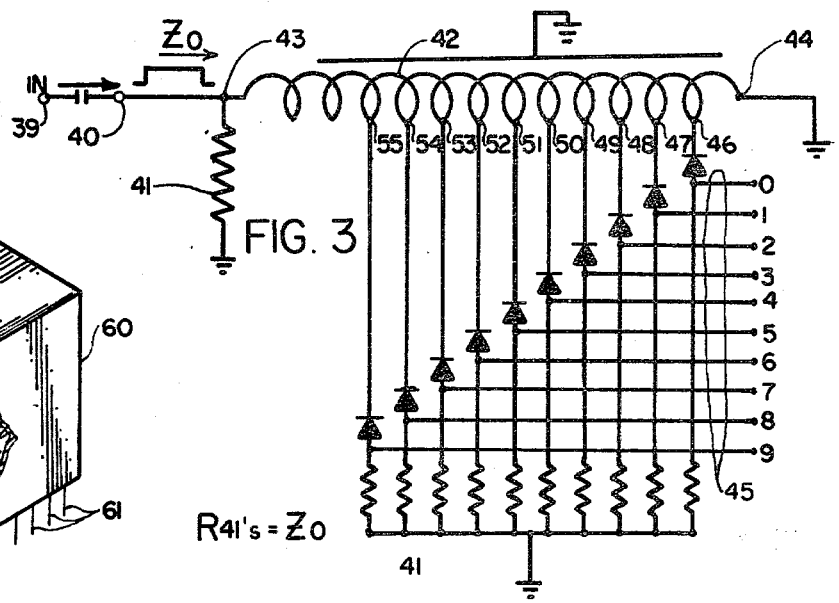
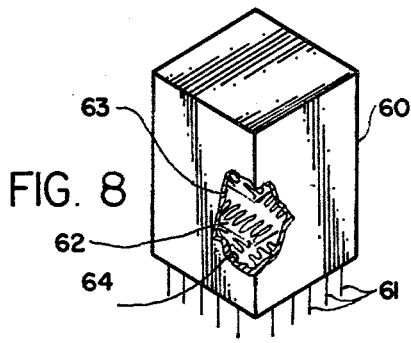
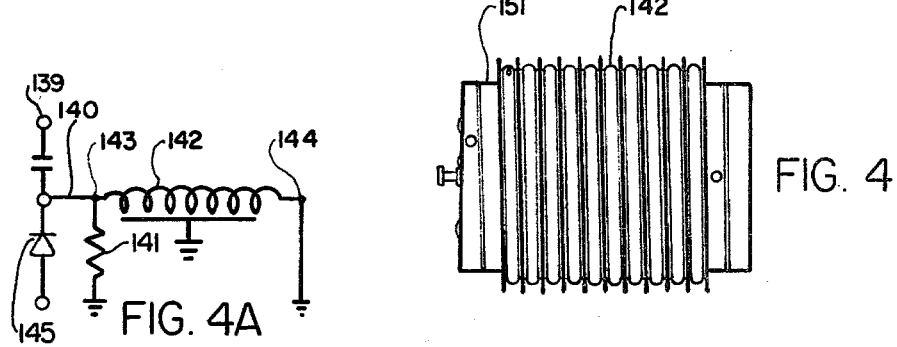
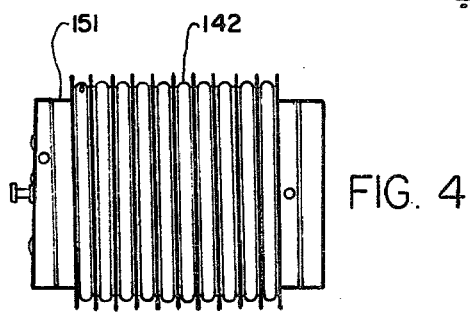
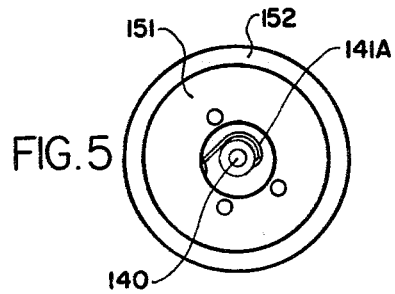
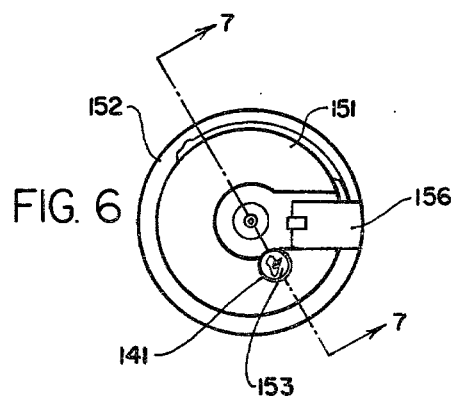
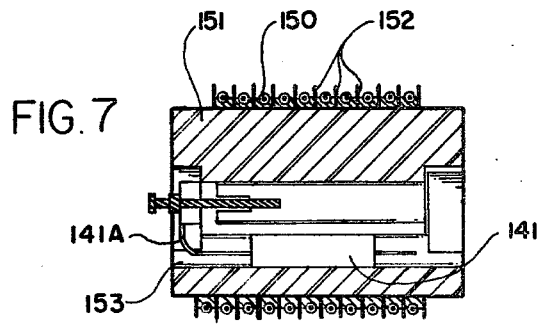

SIGNALLING SYSTEM

BACKGROUND OF THE INVENTION

The development of a reliable anticollision system has been retarded principally by inadequate signalling systems to encode the large amount of information which must be transmitted between oncoming aircraft which may be closing as much as 4000 miles per hour (6451 kilometers per hour) and to allow the analysis of the information in sufficient time for the pilot manually or by automatic means to make the corrective maneuver. This limitation in part is due to the necessity of binary coding alpha-numerics and to transmit a long train of bits with the problems of framing, synchronization, parity check, all associated with digital data transmission systems.

It has long been known that a single pulse length can represent a single digit or letter, however the reliable detection of pulse length, particularly after transmission of pulses through a medium in which the leading trailing edges are distorted, can make reliable detection impractical. By reason of this, pulse length modulation has not achieved broad acceptance.

Extensive studies have been made of the effect of transmission medium of single pulses and these have been reported in the literature. Particular reference has been made to helical transmission lines.

Representative of the prior art known to the applicant are (1) RCA Review, June 1961, pages 219 to 244. "The Helix Parametric Amplifier—A Broad-band, Solid State Amplifier", by C. Cuccia et al.

(2) Proceedings of the IRE, September 1954, "Coupling of Modes in Helixes", by J. R. Pierce et al.

(3) Proceedings of the IRE, December 1959, pages 2099 to 2105, "Coaxial Resonators with Helical Inner Conductor", by W. W. Macalpine, et al.

(4) Proceedings of the IRE, December 1959, pages 2076 to 2084, "Frequency Multiplication with non-linear Capacitors—A Circuit Analysis", by D. B. Leeson et al.

(5) Oscillators by W. A. Edson, 1953

(6) IEEE Transactions On Circuit Theory, Vol. Ct20 5#, September 1973, pages 555-567 @558-9;

Karl Renner et al, on the Design of Wave Digital Filters with Low Sensitivity properties.

(7) "Communication Engineering" by W. L. Everitt, 1932-37, McGraw Hill. Subject: Reflection, pages 128-178; see page 149, FIG. 86.

BRIEF DESCRIPTION OF THE INVENTION

I have discovered that the detection of pulse length modulated information may be achieved employing a transmission line which may take the form of a helix or other reentrant path which is terminated in a reflective termination. The helix has a plurality of taps, each one spaced from the termination a distance related to one half of a discrete pulse length in terms of its propagation rate down the medium. A diode is associated with each tap and the diode connected to the utilization device for the system.

Employing this invention, an output appears at each tap only when the leading edge of the reflected pulse coincides with the trailing edge of the same pulse prior to reflection. This coincidence indicates detection of the particular alpha-numeric symbol associated with the particular pulse length.

I have developed a series of pulse lengths so related to eliminate any ambiguous readouts.

The detector of this invention is basically a passive solid state device having linear characteristics. It is capable of use with either low or high level signals and requires no synchronization.

In one embodiment of this invention, a helical coil surrounds the terminating resistor and as a single tap. This arrangement is designed to detect a single digit only.

Another embodiment has multiple taps on helical transmission line are used.

In another embodyment, encapsulated assembly made up of a plurality of printed circuit boards each having a circuitous delay pattern is employed.

In still another embodiment a jam proof system is disclosed employing pulse length modulation with a series of spike like pulses superimposed on a longer pulse.

BRIEF DESCRIPTION OF THE DRAWINGS

This invention may be more clearly understood from the following detailed description and by reference in the drawing in which:

FIG. 1 is a respective view of a transceiver for an anti-collision system employing this invention;

FIG. 2 is a simplified block diagram of the anti-collision system of FIG. 1;

FIG. 3 is an electrical schematic of a multitapped transmission line in accordance with this invention constituting a pulse length discriminator;

FIG. 4 is a side elevational view of a single tap helix in accordance with this invention;

FIG. 5 is an end view of the single tap helix of FIG. 4;

FIG. 6 is an opposite end view from FIG. 5;

FIG. 7 is a diametrical section through the single tap helix of FIG. 4 taken along line 7—7 of FIG. 6;

FIG. 8 is a simplified perspective view of an encapsulated planar assembly in accordance with this invention;

DETAILED DESCRIPTION OF THE INVENTION

Figure 9:
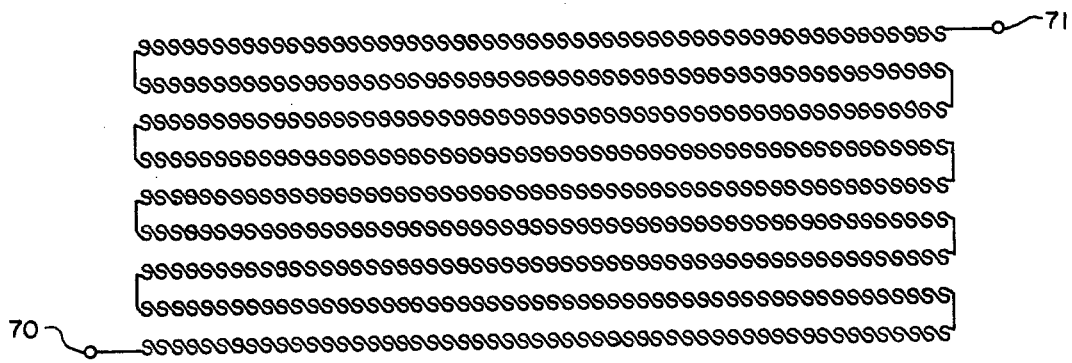
FIGS. 9 through 13 are various patterns for printed circuit transmission line useable in accordance with this invention.
Figure 10:
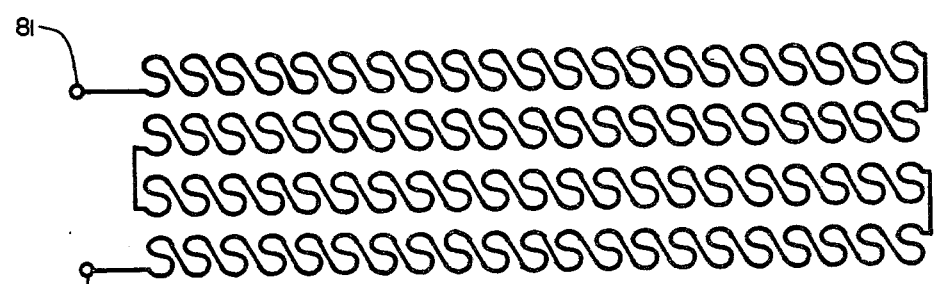

Now referring to FIG. 1, a typical application of this invention exists in an anti-collision system represented in FIG. 1. It includes a display subsystem 10 and an equipment subsystem 11 connected by a cable 12. The equipment subsystem includes an omnidirectional antenna 13 used for transmission and reception. In an aircraft installation, this antenna 13 or its equivalent would normally be mounted in the aircraft nose to provide an omnidirectional pattern but particularly forward-looking. The system of FIG. 1 serves both to encode and transmit data about the aircraft on which it is installed but also to receive transmissions from cooperating aircraft carrying equivalent equipment and to decode and display on screen 14 of the display sub-system 10.

The basic components of the system of FIG. 1 are shown in FIG. 2 to which reference is now made. The antenna 13 is connected via transmit-receive (T-R) switch 15 to both transmitter 20 and a receiver 21. The transmitter 20 is modulated by timer modulator 22 which pulse length modulates an RF carrier transmitted by the transmitter 20. The modulating signal and its encoding is accomplished employing a computer 23 and modulus forming network 24.

The receiver 21 typically includes an RF amplifier followed by a detector and video amplifier in accordance with well known radio receiver design. The output of the receiver 21 is fed to a demultiplexer 25 which for this purpose is shown as a matrix. For purposes of explanation, the receiver output is indicated as a plurality of leads when in effect it is a single lead L with the time sequences of a particular code shown at the output. A code sequence 2,6,0,0,6,4 has been received, each character constituting a pulse of length corresponding to its particular digit. Decoding of the digits occurs in the demultiplexer 25. The first pulse may constitute an identification pulse. The demultiplexer 25 may constitute a large number, e.g. 40 or 50 individual filter elements in accordance with this invention, or a single multitap demultiplexer as hereinafter disclosed. The pulses are applied in sequence to the demultiplexer 25, where in accordance with this invention they are decoded. The decoded output of the demultiplexer 25 is taken on a plurality of leads 26 to the computer 23. The number of leads 26 will correspond to the number of individual codes or characters which are employed in the system. Typically this will involve the alphabet, the numerals from "0" to "9", plus control signals such as "+", "—", ".", ",", divide, multiply, etc. The number of characters is not unlike that used in typical computer language. One significant difference however, as will become more apparent below, is that there is only one pulse for each character.

The computer 23 stores information arriving over the leads 26 in the sequence in which they are received and makes the required calculations based upon the input signals which would indicate the serial number, course, altitude, air speed, turn angle, azimuth angle and tilt angle. The collision potential of any aircraft whose signal is received is determined by the computer 23. In the event of a collision potential an output appears on the 30 to audio alarm 31 giving the pilot an alarm. Regardless of the alarm situation and particularly in the case of an alarm situation, the relative aircraft location is displayed along with the visual command for the required evasive movement of the aircraft in which the system is installed. Signals from the computer to the video display are conveyed from lead 12 represented by a number of arrows in FIG. 2.

Another input to the computer 23 is from the modulus forming network 24 which constitutes several transponders located in the aircraft which relate the same specific parameters for its own craft as those received above from other aircraft.

The timer modulator 22 receives own plane information originated in the modulus forming network from the computer 23 over leads 34 and under the control from the computer flight over lead 35. Pulse modulates the transmitter 20. This transmitter 20 employs, for example, blocking oscillators, each of which produce a pulse of different discrete length representing a specific character in the code of the system.

THE DEMULTIPLEXER CODE DETECTOR SYSTEM OPERATION

It takes two transceivers (one in each of two planes) to complete a system. The de-multiplexer, computer and flight path indicator are part of and included in the system. At specific intervals and without manual control, a "pulse coded modulus" is sent out from the unit in the plane. The second plane's transceiver unit, on reception of the first plane's code, will channel it off through the de-multiplexer 25 to the computer 23, where it is compared with data of the plane that received the code. If the code is excepted for ranging, then "computer selected" stages of the timer modulator 22 will trigger the transmitter 20 in the second plane to send back a pulse code to the first plane.

The pulse code received by plane number one will be channeled by the de-multiplexer 25 to the computer 23, therefore triggering a return pulse code. If more than two planes are in "conflict range" communication, continuous and multiple ranging will occur between all.

This system, now connected to two or more planes, will activate the pilot's visual flight path indicator scope 10 before him, which employs a sweep signal which starts and stops during its sweep, giving a cone shaped signal on the oscilloscope.

The illuminated screen 14 of the indicator displays a highway, sectioned off at intervals to appear like a paved highway. The cross sections move towards the viewer at a rate depending upon the speed of travel of the aircraft. The computer 23 which determines the intermittent timing and control of the sweep through its signals from the de-multiplexer 25 and data input networks therein, also provides "zoned communications" which enables the airplane to contact only those aircraft that are within a precalculated distance and altitude of its flight. Computer coding of the modulus, when altimeter implementation is received, is the means of signalling the first plane's altitude to the second plane's and (vice-versa).

The de-multiplexer 25 contains seventeen "highly selective pulse-length detectors." The output signals are binary (1)s appearing on the respective lead and follow the pulse trailing edge. The signals are fed directly into the computer 23. A suitable code is set forth below which is arranged to accommodate short pulse lengths and to reduce the helix length by adjusting each character a minimum of ±10 nanoseconds of the multiples of each character lengths. A spacing of 2010 nanoseconds between each character pulse is required.

| CODE A | | | | | | | | | | |
|---|---|---|---|---|---|---|---|---|---|---|
| Codes of the Decimal Number System | | | | | | | | | | |
| 0 | 1 | 2 | 3 | 4 | 5 | 6 | 7 | 8 | 9 | |
| Pulse length time in nanoseconds | | | | | | | | | | Code # |
| 110 | 170 | 210 | 250 | 290 | 350 | 400 | 470 | 520 | 590 | A 1 |
| 640 | 680 | 730 | 790 | 840 | 880 | 920 | 970 | 1030 | 1080 | A 2 |

-continued

| CODE A | | | | | | | | | | |
|---|---|---|---|---|---|---|---|---|---|---|
| Codes of the Decimal Number System | | | | | | | | | | |
| 0 - | 1 - | 2 - | 3 | 4 - | 5 - | 6 - | 7 - | 8 - | 9 | Code # |
| Pulse length time in nanoseconds | | | | | | | | | | |
| 1120 | 1170 | 1210 | 1270 | 1330 | 1390 | 1430 | 1470 | 1510 | 1550 | A 3 |
| 1600 | 1640 | 1700 | 1740 | 1780 | 1820 | 1860 | 1900 | 1950 | 1990 | A 4 |

CODE B

The following describes a 51 character code which provides the use of longer pulse lengths. The length of any character pulse in the code, or of its multiples, added to other characters will not result in a code character length within ±20 nanoseconds. The character rate of this transmission system is in the order of 165,610 characters per second, i.e. Rate—Maximum character length plus spacing.

CODE B

Rate = $1/(3020+3040)10^{-9}$ = 165,610 characters per second

The "v" in the alphabet code will substitute for the letter "u", which has been omitted. The letter "q" in a word is always followed by the letter "u". The letter "q" will be used for selecting other code numbers from code zero such as: "q 1", "q 2", "q 3", etc.

Code #1, 2, 3, etc.

| Spike spacing or Pulse length time in nano/sec. | Helix taps above ground time in nano/sec. | CODE B Code #0 | Arithmetic Trigonometric Logarithmic Code #1 | Coded Code Code #2 etc. |
|---|---|---|---|---|
| 1020 | 510 | period | 0 | 0 |
| 1060 | 530 | comma | 0 | 0 |
| 1100 | 550 | colon | 0 | 0 |
| 1140 | 570 | semicolon | 0 | 0 |
| 1180 | 590 | apostrophe | 0 | 0 |
| 1220 | 610 | quotation | 0 | 0 |
| 1260 | 630 | underscore | 0 | 0 |
| 1300 | 650 | question | 0 | 0 |
| 1340 | 670 | fraction | 0 | 0 |
| 1380 | 690 | percent | 0 | 0 |
| 1420 | 710 | bracket left | 0 | 0 |
| 1460 | 730 | bracket right | 0 | 0 |
| 1500 | 750 | plus | 0 | 0 |
| 1540 | 770 | minus | 0 | 0 |
| 1580 | 790 | space bar | 0 | 0 |
| 1620 | 810 | "q" code change | 0-Code Change-- | 0 |
| 1660 | 830 | r | 0 | 0 |
| 1700 | 850 | s | 0 | 0 |
| 1740 | 870 | t | 0 | 0 |
| 1780 | 890 | v | 0 | 0 |
| 1820 | 910 | w | 0 | 0 |
| 1860 | 930 | x | 0 | 0 |
| 1900 | 950 | y | 0 | 0 |
| 1940 | 970 | z | 0 | 0 |
| 1980 | 990 | a | 0 | 0 |
| 2020 | 1010 | b | 0 | 0 |
| 2060 | 1030 | c | 0 | 0 |
| 2100 | 1050 | d | 0 | 0 |
| 2140 | 1070 | e | 0 | 0 |
| 2180 | 1090 | f | 0 | 0 |
| 2220 | 1110 | g | 0 | 0 |
| 2260 | 1130 | h | 0 | 0 |
| 2300 | 1150 | i | 0 | 0 |
| 2340 | 1170 | j | 0 | 0 |
| 2380 | 1190 | k | 0 | 0 |
| 2420 | 1210 | l | 0 | 0 |
| 2460 | 1230 | m | 0 | 0 |
| 2500 | 1250 | n | 0 | 0 |
| 2540 | 1270 | o | 0 | 0 |
| 2580 | 1290 | p | 0 | 0 |
| 2620 | 1310 | 0 | 0 | 9 |
| 2660 | 1330 | 1 | 1 | 7 |
| 2700 | 1350 | 2 | 2 | 5 |
| 2740 | 1370 | 3 | 3 | 3 |
| 2780 | 1390 | 4 | 4 | 1 |
| 2820 | 1410 | 5 | 5 | 8 |
| 2860 | 1430 | 6 | 6 | 6 |
| 2900 | 1450 | 7 | 7 | 4 |
| 2940 | 1470 | 8 | 8 | 2 |
| 2980 | 1490 | 9 | 9 | 0 |
| 3020 | 1510 | 0 Interrogation | 0 Signal | 0 |

The heart of the system of FIGS. 1 and 2 constitutes the pulse length detectors present constituting the demultiplexer 25. Each of the other functions performed in the system of FIG. 2 are well known within the state of the art and may be accomplished by sub-systems already available and known. The generation of pulse length modulation signals employing blocking oscillators is easily accomplished as is the transmission of such signals. The information handling employing the computer 23 and the display 14 are all within the state of the art. However, the reliable detection of pulse length modulated signals having a difference as slight as 40 nanoseconds (±20 nanoseconds) with the length of the pulse in the pulse code ranging from a mimimum of 100 to a maximum of 2000 nanoseconds has not been reliably accomplished. The rise and fall time should be something less than 20 nanoseconds. Therefore the demultiplexer of FIG. 3, as simple as it is, accomplishes this decoding on a reliable basis and constitutes an extremely significant advance in the art, and one which makes the system of FIGS. 1 and 2 practical.

The demultiplexer of FIG. 3 includes an input terminal 40 representative of one of the input arrow heads to the demultiplexer 25 of FIG. 2. An impedance element, resistance 41 is connected between an input line whereby signals reaching the input terminal 40 are conveyed to the following helix delay line 42 without reflection. The helix 42 has one end connected to the ungrounded end of resistance 41 at junction 43 and the opposite end thereof 44 grounded. A small capacitor 39, e.g. 10–200 picofarads was selected and inserted at the input to the helix 40 to reduce the amount of current reflected from ground.

The helix 42 is typically air core and wound of 40 gauge wire closely spaced. The helix 42 shows 10 taps, one for each digit. Connected to each tap is a reverse poled diode 46–55, each with its anode connected through a load resistor to ground. The output from each tap is taken from the anode of each diode to output leads 45. The diode is actually two or more series connected diodes such as a type IN700 of Fairchild Semiconductor Corporation of El Monte, Calif.

A typical application employing 40 numerals the total number of turns is 49.75 and each turn represents a 20 nanosecond delay. Thus, the total length of the helix is 995 nanoseconds and in accordance with this invention, allows the detection of pulses up to 1990 nanoseconds. The minimum practical pulse length difference is 1 turn or 20 nanosecond, however, it has been found that the preferred difference in pulse length for the above code should average at least 24.8 nanoseconds.

The helix of FIG. 3 is shown with 10 taps for illustration purposes, however, in a more typical application it will have 40 taps, one associated with each of the letters of the alphabet, one with each of the numerals "0" to "9", and 1 for each of the symbols, ".", ",", "+", and "—".

Where additional symbols are required, the helix may be extended in length without impairment of operation. The tapped helix constitutes the simplest and most effective embodiment of this invention since the weight and volumetric efficiency of the detector is of great importance in airborne applications. The same effect can be achieved, however, with multiple individual helixes, each of which have their own matching input resistor and an end tap only. An example of a physical embodiment of such a device is shown in FIG. 4 which has the electrical length of 200 nanoseconds equivalent to numeral 6 in Code A1 above.

Structurally, the individual helix member of FIGS. 4 and 4a may be seen in more detail in FIGS. 5–7 to which reference is now made along with FIG. 4. The helix 142 in the example shown constitutes 6000 turns (200 feet) (60m.) of fine cooper wire, for example 40 gauge, wound around a one-eighth-inch (3.175 mm.) insulating support 150 which itself is wound on a coil form 151 having electrically grounded separator fins 152 separating each turn of the wound support 150. The resistance 141 is located in a longitudinally extending off-axis cavity 153 in the coil form 151. The input terminal 140 is connected to the adjacent lead 141a of the resistance 141 and to the one end of the helix through an opening in the helix coil support 151 which opening does not appear in the drawing. A ground tab 156 grounds the opposite end of resistance 141 and the fins 152.

In one specific embodiment, the helix 142 and its entire assembly is shown in FIG. 4 as 1¾" (4.45 cm.) diameter and 2½" (6.35 cm.) long. Where space is not a consideration, this embodiment of the invention may well be used with the resultant advantage of additional isolation achieved. The 200 foot (60.96 m.) helix provides a transmission time of 200 nanoseconds and thus detects a pulse length of 400 nanoseconds.

In accordance with the schematic appearing in FIG. 4a employing the embodiment of FIG. 4, one such assembly is required for each character to be received and the length of each helix is different. In FIG. 4a, the comparable elements to those of FIG. 3 bear reference numerals which have identical last two digits as in FIG. 3 but within the 100 series, thus the input terminal is 140 and a particular helix is 142. The impedance matching resistance is 141 and the junction between between the helix and the resistance 141 is 143. Output is again taken at the terminal 140 via reverse poled diode 145.

It has been found, however, that a need for separate helixes is unnecessary and that they may all constitute single elongated helix of the same general type shown in FIG. 4 with more efficient utilization of the coil support volume or preferably in the form of a series of connected flat printed circuit helixes or spirals in the format as shown in FIGS. 9–13 and encapsulated into a single structural element as shown in FIG. 8.

Figure 11:
Figure 12:
Figure 13:

Referring now to FIGS. 8 and 9 particularly, FIG. 8 is a module 60 having a plurality of pin terminals 61 extending out of one side. A portion of the module 60 is broken away to show plurality of internally contained stacked printed circuit boards 62, 63, and 64, each of which carry zig-zag patterns which constitute the delay line of this invention. A typical configuration for the printed circuit board 62, 64 of FIG. 8 is as shown in FIG. 9 which appears to be a continuous conductive path in the form of a series of "Z" shapes. In the approximate size shown in FIG. 9 of this application, the total conductive length of each line is approximately 12.4" and with 11 lines constitutes 136.4" of conductive path. This constitutes approximately 11.4 nanoseconds of delay transmission between input terminal 70 and output terminal 71. Approximately 88 of such boards stacked constitute one micro-second (1000 nanoseconds) delay. This is sufficient to encode approximately 50 numerals. With appropriate photo reduction plus the addition of multiple boards, it allows the production of 1000 nanosecond board module having an overall volume of approximately 19.0 cubic inches. Another configuration appears in FIG. 10 employing input terminal 80 and output terminal 81. Delay lines of the type shown in FIGS. 9 and 10 may easily be tapped in intermediate point. This is illustrated in FIG. 11 employing input terminal 90, output terminal 91 and intermediate tap 92 taken at the opposite side of the stack of individual conductors. In the case of FIGS. 11-13, these constitute end views of a number of printed circuit boards similar to the configuration shown in FIG. 8. In FIG. 11, employing the format of FIG. 10, the total of 48" (122 cm.) of delay may be achieved.

THEORY OF OPERATION

Figure 14:
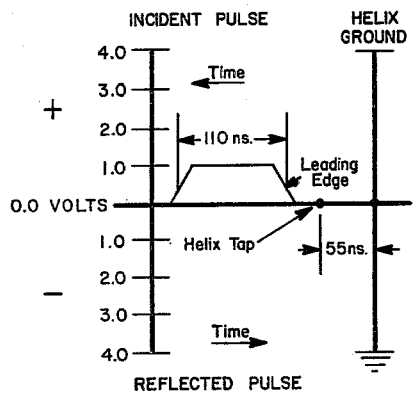
FIGS. 14-19 are timing diagrams showing several conditions of pulse reception.
Figure 15:
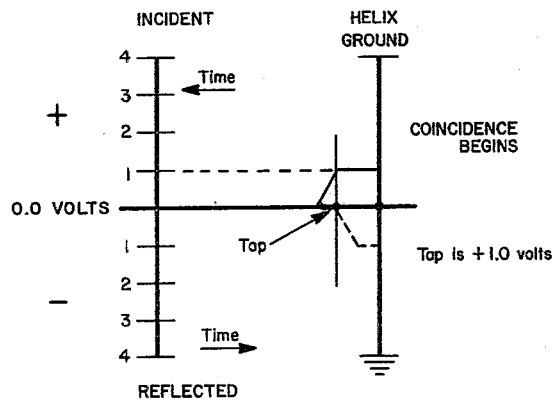
Figure 16:
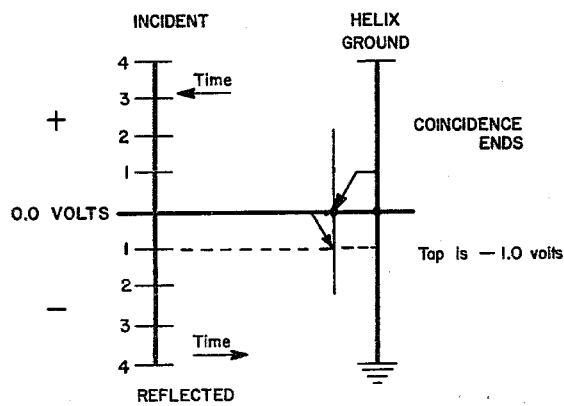

The operation of the pulse detector of this invention may be best understood by reference to FIGS. 14, 15 and 16 which constitute graphical representations of a single pulse of amplitude 1 volt incident upon the helix or delay line of this invention. In the example appearing in these figures, the pulse is 110 nanoseconds in length with sufficient rise time and fall time thereby resulting in a general trapezoidal shape. When the helix is designed to detect such a pulse, the tap is located at half of the pulse length from helix ground, in this case 55 nanoseconds. As the leading edge of the pulse reaches the helix ground, the impedence mismatch causes a reflection of a pulse at the same rate of speed back along the line and this is represented by the end of the incident pulse appearing in FIG. 15, still at +1 volt, and the reflective pulse at opposite polarity. The tap remains at the +1 volt level until coincidence appears between the leading edge of the reflected pulse and trailing edge of the incident pulse, at which time the tap changes to a −1 volt, as is shown in FIG. 16. The transient with a rise time of less than 10 nanoseconds is conducted by the diode associated with that tap to the output of the detector. The location of taps is selected such that the only time coincidence appears between the leading and trailing edge of one pulse length. The spacing between pulses is greater than the maximum pulse length to avoid coincidence between the leading edge of one pulse and trailing edge of another. A pulse spacing of 2010 nanoseconds for CODE A displayed above has been found to be more than adequate to achieve this form of protection from erroneous triggering. Even with this spacing, the character rate of this transmission system is in the order of 250,000 characters per second, i.e. Rate Maximum character length plus spacing.

CODE A

RATE = $1/(1990+2010)10^{-9}$ = 250,000 characters per second

Figure 17:
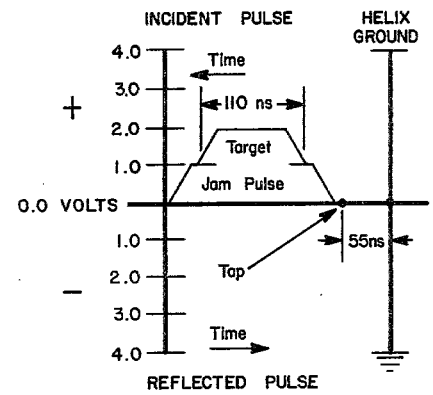
Figure 18:
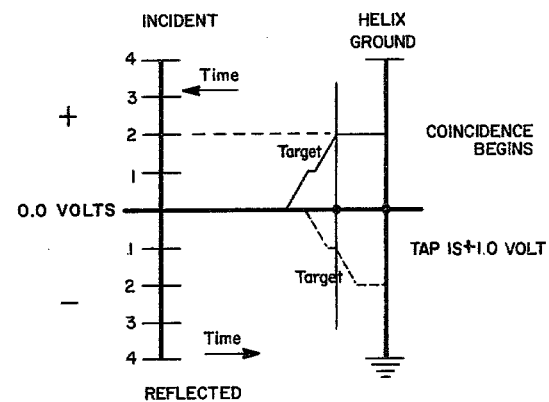
Figure 19:
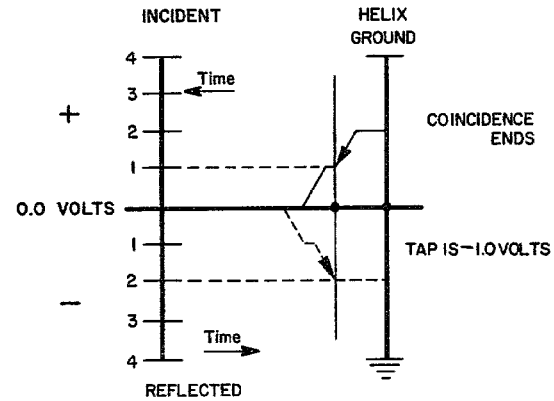

The coding of this invention includes inherent protection from jamming where jamming is done by introduction of overriding jam pulses. This is illustrated in FIGS. 17, 18 and 19. The correct target pulse merely rides on the jam pulse and the jam pulse fails to trigger the detection unless its length coincides with exact digit length. Typically, jam pulses will be longer than the pulse sequence employed and even though the target pulse is superimposed on the jam pulse, it will be detected in the same manner as in the absence of a jamming pulse.

Figure 20:
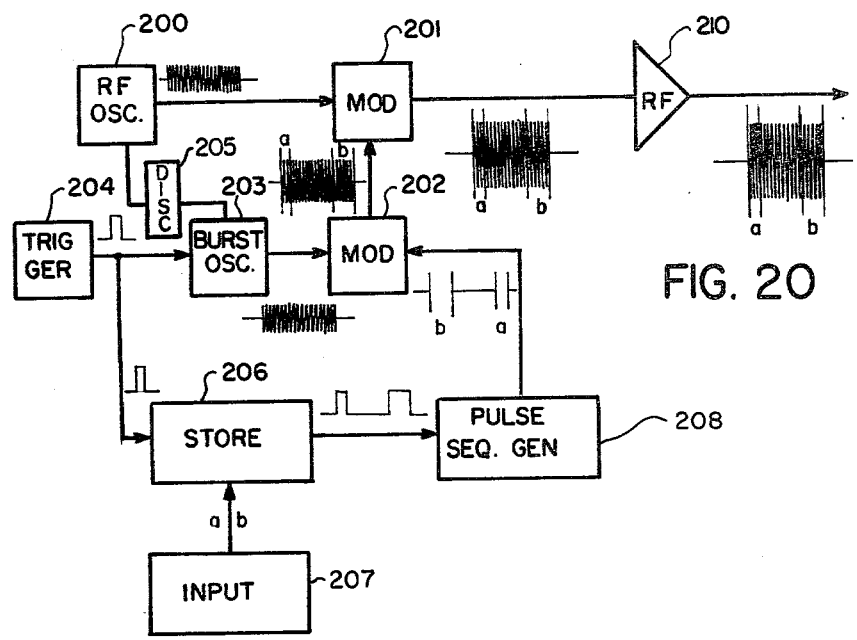
FIG. 20 is a block diagram of an alternate embodiment transmitter producing a substantially jam proof signal.

It is possible to further enhance the immunity of the system to interference of spurious signals by adding to the signal a burst command which is in the form of a pair of superimposed spikes which, to all intents and purposes, appears as noise spikes, however, have a predetermined relationship indicating the pulse to be a valid one. As an example, the spikes may have a predetermined distance or time delay between the two. This embodiment is illustrated in FIG. 20 showing the transmitter circuitry for generating a composite signal including pulse length signal of the type described above and superimposed on top of it a pair of spiked pulses of a distance or time L therebetween. The system of FIG. 20 employs an RF oscillator 200 which drives a modulator 201. The modulator 201 itself is driven by a modulator 202 which combines the output of a phase controlled burst oscillator 203. The burst oscillator 203 receives synchronizing voltage from oscillator 200 through the discriminator 205 and furnishes a pulse of the nature of the wave form shown responsive to a trigger pulse from a trigger circuit 204. The trigger circuit 204 is used to dump a digit in the memory 206, as has been set up in the memory by the input device 207, e.g. a teletypewriter. The stored digit from the memory 206 drives a pulse generator 208 producing a pair of spikes at spacing L which is then superimposed in modulator 202 on the burst from the first oscillator 203 and through our amplifier 210 enters the RF channel as indicated by the arrow to the right.

Figure 21:
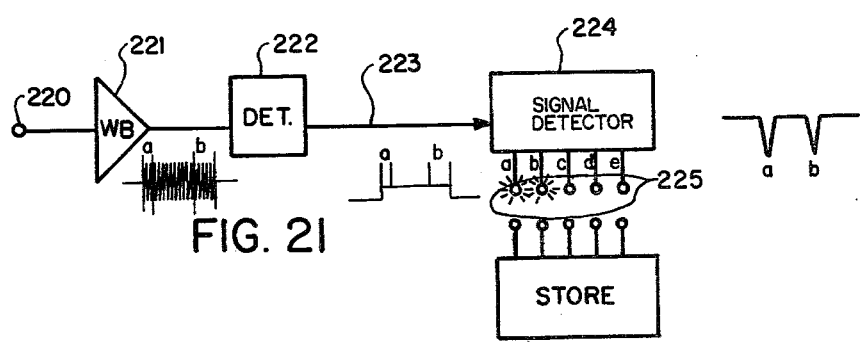
FIG. 21 is a block diagram of a receiver associated with the transmitter of FIG. 20.

The detection of the pulse produced by the transmitter of FIG. 20 is accomplished in the system of receiver of FIG. 21. When the signal is applied to the input terminal 220 and wide bank amplifier 221, it appears as the complex wave form present below the wide band amplifier in FIG. 21. This signal is then envelope detected in detector 222 producing the pedestal with the series of spikes with spacing L appearing on the 223. This wave train is introduced into the signal detector 224 which includes a number of output leads 225 corresponding to the number of individual characters employed in the system. This system is immune from jamming to a large extent because of the necessity to jam the composite of the pedestal plus the spikes.

Employing either the single helix, the tapped helix or the composite system of FIGS. 20-21, the foregoing codes for the pulse length or spike spacing has been determined to be effective in providing virtually error free transmission and detection of numerical data with a minimum of error and a minimum bandwidth as well as high speed transmission.

The above described embodiments of this invention are merely descriptive of its principles and are not to be considered limiting. The scope of this invention instead shall be determined from the scope of the following claims including their equivalents.

What is claimed is:

1. In a signalling system for alphanumeric data including means for generating a pulse having a length related to a specific alphanumeric symbol;
    means for modulating a radio frequency carrier with said pulse to produce a radio frequency signal;
    means for transmitting the pulse modulated carrier;
    a receiver including means for demodulating the radio frequency signal to detect the received pulse;
    the improvement comprising means introducing said pulse into a transmission line having a reflective termination;
    said transmission line having at least one detector tap spaced from said termination at a distance related to half the length of said pulse at the propagation rate of the pulse along said transmission line;
    means connected to said tap for detecting coincidence between the leading and trailing edge of said pulse; and means responsive to detected coincidence by said means for detecting coincidence for registering the alphanumeric symbol, corresponding to said top.

2. The combination in accordance with claim 1 wherein said transmission line comprises a delay line with one end terminating in a reflective termination and the input end thereof connected to said means for introducing said pulse into said transmission line.

3. The combination in accordance with claim 2 including an impedance connected across the input to said transmission line;
said impedance substantially matching the characteristic impedance of said means for introducing pulses into said transmission line.

4. The combination in accordance with claim 3 wherein said impedance comprises a resistance.

5. The combination in accordance with claim 2 wherein said delay line has a length greater than one half the longest pulse to be detected by said signalling system.

6. The combination in accordance with claim 2 wherein said delay line includes a plurality of taps, each one associated with different pulse lengths; with each of said taps continually providing detection of its respective pulse length.

7. The combination in accordance with claim 6 wherein each of said taps is located one half pulse length from the termination of said delay line.

8. In a signalling system for alphanumeric data including means for generating a pulse having a length related to a specific alphanumeric symbol;
means for modulating a radio frequency carrier with said pulse to produce a radio frequency signal;
means for transmitting the pulse modulated carrier;
a receiver including means for demodulating the radio frequency signal to detect the received pulse;
the improvement comprising means introducing said pulse into a transmission line having a reflective termination;
said transmission line having at least one detector tap spaced from said termination at a distance related to half the length of said pulse at the propagation rate of the pulse along said transmission line;
means connected to said tap for detecting coincidence between the leading and trailing edge of said pulse; and
means responsive to detected coincidence by said last means for registering the alphanumeric symbol, corresponding to said tap;
wherein said transmission line comprises a delay line with one end terminating in a reflective termination and the input end thereof connected to the signal source; and
wherein said tap includes a diode poled to block signals of the polarity of incident signals at said transmission line.

9. In a signalling system for alphanumeric data including means for generating a pulse having a length related to a specific alphanumeric symbol;
means for modulating a radio frequency carrier with said pulse to produce a radio frequency signal;
means for transmitting the pulse modulated carrier;
a receiver including means for demodulating the radio frequency signal to detect the received pulse;
the improvement comprising means introducing said pulse into a transmission line having a reflective termination;
said transmission line having at least one detector tap spaced from said termination at a distance related to half the length of said pulse at the propagation rate of the pulse along said transmission line;
means connected to said tap for detecting coincidence between the leading and trailing edge of said pulse; and
means responsive to detected coincidence by said last means for registering the alphanumeric symbol, corresponding to said tap;
wherein said transmission line comprises a delay line with one end terminating in a reflective termination and the input and thereof connected to the signal source; and
wherein said delay line comprises an elgonated support member, a plurality of turns wound thereon equal in length to the transmission time of at least one-half the length of a pulse to be detected thereby;
said support mounting a resistance element;
an input terminal secured to said support in electrical contact with one terminal of said resistance element and one end of said plurality of turns.

10. A pulse length detector comprising:
a delay line having an input terminal, an output terminal and an electrical length equal to at least one-half of the length of the longest pulse to be detected thereby;
means reflectively terminating said delay line at said output terminal;
tap means connected to said delay line at a point spaced from said terminating means;
means connected to the input terminal of said delay line substantially matching the characteristic impedance of the source of pulses to be detected, said tap means including means for detecting coincidence between the leading edge of a pulse in said delay line reflected by said termination and trailing edge of said pulse.

11. A pulse length detector comprising:
a delay line having an electrical length equal to at least one half of the length of the longest pulse to be detected thereby
means reflectively terminating said delay line;
tap means connected to said delay line at a point spaced from said terminating means;
means connected to the input of said delay substantially matching the characteristic impedance of the source of pulses to be detected, said tap means including means for detecting coincidence between the leading edge of a pulse in said delay line reflected by said termination and trailing edge of said pulse;
wherein said detecting means comprising a diode connected to said tap and lead means connected to the terminal of said diode remote from said tap.

12. A pulse length detector comprising:
a delay line having an input terminal, an output terminal and an electrical length equal to at least one half of the length of the longest pulse to be detected thereby;
means reflectively terminating said delay line;
tap means connected to said delay line at a point spaced from said reflectively terminating means;
means connected to the input terminal of said delay line substantially matching the characteristic impedance of the source of of pulses to be detected, said tap means including means for detecting coincidence between the leading edge of a pulse in said delay line reflected by said termination and trailing edge of said pulse;

wherein said detecting comprises a diode connected to said tap and lead means connected to the terminal of said diode remote from said tap;

wherein said detecting means comprises at least a pair of diodes each connected to a different tap on said delay line and each at a different electrical distance from said termination; and individual leads from said diodes at terminals thereof remote from said taps for detecting pulses of different lengths.

13. A signalling system comprising:

an oscillator for producing a carrier signal;
a first modulator for modulating said carrier;
a burst oscillator for producing a burst of oscillations;
said burst of oscillations having a predetermined length;
said burst oscillator responsive to a trigger signal applied thereto;
a trigger signal generator;
a source of informational signals;
means for generating a signal having a length related to the information content of each informational signal;
a second modulator for modulating the output of said burst oscillator with said signals from said generating means; and
means for introducing the output of said second modulator into said first modulator whereby a carrier modulator with pulse length modulated burst is produced.

14. The combination in accordance with claim 13 wherein said signal generating means produces a pair of spikes having a spacing therebetween representative of the information content thereof.

15. The combination in accordance with claim 14 including detection means for signals from said system comprising:

an envelope detector;
a transmission line having a reflective termination;
said transmission line having at least one tap spaced from said termination at a distance of one-half the spacing between a pair of spikes representing a signal; and
means connected to said tap for detecting coincidence between the reflected first and the incident second spike representing a signal.

* * * * *